US009280587B2

United States Patent
Renders et al.

(10) Patent No.: US 9,280,587 B2
(45) Date of Patent: Mar. 8, 2016

(54) MAILBOX SEARCH ENGINE USING QUERY MULTI-MODAL EXPANSION AND COMMUNITY-BASED SMOOTHING

(71) Applicant: Xerox Corporation, Norwalk, CT (US)

(72) Inventors: Jean-Michel Renders, Quaix-en-Chartreuse (FR); Amin Mantrach, Barcelona (ES)

(73) Assignee: XEROX CORPORATION, Norwalk, CT (US)

( * ) Notice: Subject to any disclaimer, the term of this patent is extended or adjusted under 35 U.S.C. 154(b) by 300 days.

(21) Appl. No.: 13/832,463

(22) Filed: Mar. 15, 2013

(65) Prior Publication Data

US 2014/0280207 A1  Sep. 18, 2014

(51) Int. Cl.
*G06F 17/30* (2006.01)
*G06Q 10/00* (2012.01)

(52) U.S. Cl.
CPC ...... *G06F 17/3053* (2013.01); *G06F 17/30672* (2013.01); *G06Q 10/00* (2013.01)

(58) Field of Classification Search
CPC ............................ G06F 17/30864; G06F 17/30
USPC .................................................. 707/748, 752
See application file for complete search history.

(56) References Cited

U.S. PATENT DOCUMENTS

| 8,433,705 | B1 * | 4/2013 | Dredze et al. ................. 707/723 |
| 2003/0221166 | A1 * | 11/2003 | Farahat et al. ................ 715/513 |
| 2012/0011129 | A1 * | 1/2012 | van Zwol et al. ............. 707/748 |
| 2012/0095952 | A1 * | 4/2012 | Archambeau et al. .......... 706/52 |

OTHER PUBLICATIONS

Nick Craswell et al., Searching for Experts not just for Documents, 2001, Google Scholar, 5 pages.*
Albright, et al. "Algorithms, initializations, and convergence for the nonnegative matrix factorization" NCSU Technical Report Math 81706, http://meyer.math.ncsu.edu/Meyer/Abstracts/Publications.html, 2006, pp. 1-18.
Amin, et al. "People retrieval leveraging textual and social data" Invention Proposal: Oct. 2011, pp. 1-7.
Balog, et al. "Formal models for expert finding in enterprise corpora" SIGIR 2006, 2006, pp. 43-50.

* cited by examiner

*Primary Examiner* — Jean B Fleurantin
(74) *Attorney, Agent, or Firm* — Fay Sharpe LLP

(57) ABSTRACT

A retrieval method on a database of documents including text and names of participants associated with the documents includes: receiving a text query facet of keywords and a persons query facet of participant names; computing an enriched text query as an aggregation of the text query facet, a monomodal expansion of the text query facet based on the keywords, a cross-modal expansion of the text query facet based on the participant names, and a topic expansion of the text query facet based on a topic model associating words and topics; computing an enriched persons query as an aggregation of the persons query facet, a monomodal expansion of the persons query facet based on the participant names, a cross-modal expansion of the persons query facet based on the keywords, and a community expansion of the persons query facet based on a community model associating persons and communities.

21 Claims, 3 Drawing Sheets

MAILBOX SEARCH ENGINE USING QUERY MULTI-MODAL EXPANSION AND COMMUNITY-BASED SMOOTHING

BACKGROUND OF THE INVENTION

The following relates to the document retrieval arts, document indexing arts, electronic mail (email) arts, and related arts.

Electronic mail (email) management is a common task for business management personnel, office assistants, scientists, engineers, and most other persons engaged in business, education, government, or non-profit activities. Email is also commonly used for personal activities, and users often maintain both business and personal email accounts. Email is efficient, enables transfer of files as attachments, facilitates cooperation across time zones or different work schedules via effective time-shifting, and so forth. Indeed, email is such an effective communication channel that a substantial problem is its overuse email users commonly receive dozens or even hundreds of email messages each day, and find it difficult to process this information overload.

Current email processing software offer a plethora of features for managing this influx of email messages, such as: junk email filtering, conversation viewing modes which group together email messages linked by reply or forward operations, indexed email search and folder management, and so forth. However, many of these features require substantial user input. For instance, the user who wants to organize folders needs to define the filtering rules that will apply to each new incoming message. These rules then require frequent manual updating, and the user may need to create, merge and remove folders in order to maintain a good structure in her mailbox.

Existing search functionality also exhibits various limitations. The search often consists of finding a match between the input query and an email message by using similarities based on "bag-of-words" representations of the query and messages (or even simply Boolean presence/absence models). Such search systems are only able to retrieve documents that contain matching keywords. These search systems also do not take into account the social information that may be available in email messages.

BRIEF SUMMARY OF THE INVENTION

In some illustrative embodiments disclosed as illustrative examples herein, a non-transitory computer-readable storage medium stores instructions executable by a computer to perform a retrieval method on a database of documents including text and names of participants associated with the documents by operations including: receiving a multi-faceted retrieval query having a text query facet comprising one or more keywords and a persons query facet comprising one or more participant names; computing an enriched text query as an aggregation of the text query facet, a monomodal expansion of the text query facet based on the one or more keywords, a cross-modal expansion of the text query facet based on the one or more participant names, and a topic expansion of the text query facet based on a topic model associating words and topics; computing an enriched persons query as an aggregation of the persons query facet, a monomodal expansion of the persons query facet based on the one or more participant names, a cross-modal expansion of the persons query facet based on the one or more keywords, and a community expansion of the persons query facet based on a community model associating persons and communities; and performing ranking including at least one of: (1) generating a ranking of documents by sorting similarities between the enriched text query and documents of the database, and (2) generating a ranking of persons by sorting the enriched persons query.

In some illustrative embodiments disclosed as illustrative examples herein, an apparatus comprises a computer and a non-transitory computer-readable storage medium as set forth in the immediately preceding paragraph storing instructions executable by the computer to perform a retrieval method on a database of documents including text and names of participants associated with the documents.

In some illustrative embodiments disclosed as illustrative examples herein, a retrieval method operates on a database of documents including text and names of participants associated with the documents, the retrieval method comprising: receiving a retrieval query having at least one of a text query facet comprising one or more keywords and a persons query facet comprising one or more participant names; performing query enrichment including at least one of: (1) computing an enriched text query as an aggregation of the text query facet, a monomodal expansion of the text query facet based on the one or more keywords, a cross-modal expansion of the text query facet based on the one or more participant names, and a topic expansion of the text query facet based on a topic model associating words and topics, and (2) computing an enriched persons query as an aggregation of the persons query facet, a monomodal expansion of the persons query facet based on the one or more participant names, a cross-modal expansion of the persons query facet based on the one or more keywords, and a community expansion of the persons query facet based on a community model associating persons and communities; and performing ranking including at least one of: (1) generating a ranking of documents by sorting similarities between the enriched text query and documents of the database, and (2) generating a ranking of persons by sorting the enriched persons query. The retrieval method is suitably performed by a computer.

In some illustrative embodiments disclosed as illustrative examples herein, a non-transitory computer-readable storage medium stores instructions executable by a computer to generate a set of topics comprising word distributions and a set of communities comprising participant distributions by performing the non-negative matrix factorizations:

$$\begin{cases} X_w = \Theta \Gamma_t \Phi_t, & \Theta \geq 0, \Phi_t \geq 0, \Gamma_t \geq 0 \\ X_u = \Theta \Gamma_c \Phi_c, & \Theta \geq 0, \Phi_c \geq 0, \Gamma_c \geq 0 \end{cases}$$

where $X_w$ is a term-document matrix storing distributions of words in documents of a set of documents, $X_u$ is a participant-document matrix storing participants associated with the documents of the set of documents, $\Phi_t$ is a term-topic distribution matrix storing word distributions for the topics, $\Phi_c$ is a participant-community distribution matrix storing participant distributions for the communities, $\Theta$ is a matrix storing the hyper-topic distributions associated with the documents of the set of documents, $\Gamma_t$ is a matrix representing the topic distribution per hypertopic, and the $\Gamma_c$ is a matrix representing the community distribution per hypertopic.

DETAILED DESCRIPTION OF THE INVENTION

Figure 1:
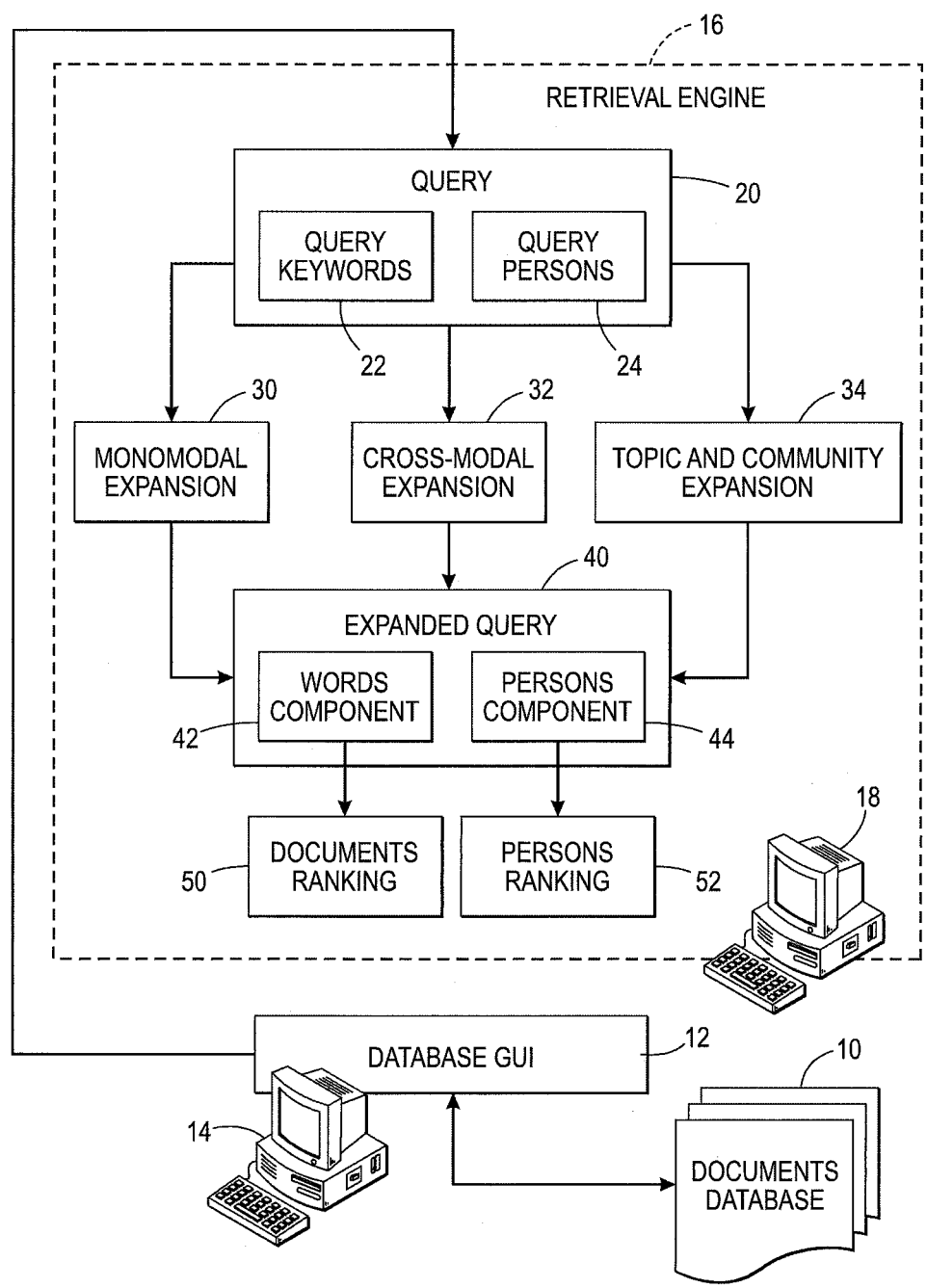
FIG. 1 diagrammatically shows an illustrative document (e.g. email message) retrieval system as disclosed herein.

Disclosed herein are techniques for document retrieval, suitably employed in an email system in the illustrative examples. The approach automatically decomposes the documents (e.g. email messages) of the documents database (e.g., personal or shared mailbox) into virtual folders corresponding to topics and communities in an unsupervised way. The retrieval approaches disclosed herein enable searching for emails and/or for people (i.e. "participants" in the email messages) by submitting a query that includes key words and/or "key-persons" for one or more roles that a person can play with respect to the documents (email messages) in the collection. By way of illustrative example, some possible social roles include: "author_of", "commenter_of", "recipient_of", "cited_by", and so forth. While in some embodiments different participation roles are considered, in another embodiment a single aggregative (i.e. global) role is considered, which is suitably referred to herein as the "participates_in" role. Advantageously, the retrieval techniques disclosed herein enable the user to retrieve related documents that do not necessarily contain the key-words or the key-persons included in the query. This enables the retrieval of certain kinds of documents that a matching search-based system would not retrieve. For example, by using person profiles, the disclosed retrieval approaches rank email messages related to key persons of the query without requiring them to be participants (e.g. authors or recipient) of the email messages. The disclosed retrieval techniques also retrieve documents sharing the same topics as the key-words but not necessarily containing those key-words. As yet another example, the disclosed retrieval techniques retrieve other participants who are members of the communities associated to the key-persons.

In some embodiments directed to email management, the disclosed retrieval systems suitably compute relevance scores for documents and/or persons in a mailbox search engine. The disclosed approaches employ a combination of two query enrichment (or query smoothing) mechanisms, which exploit the multi-modal aspects (textual and social) of both the email collection and the query (even if the query is mono-modal, i.e. includes only keywords, or only key-persons). One enrichment (or expansion) mechanism is based on cross-modal pseudo-relevance feedback. Another enrichment (or expansion) mechanism is based on unsupervised joint extraction of topics and communities, in the spirit of multi-view topic models.

While email management is disclosed herein as an illustrative example, it is to be appreciated that the disclosed retrieval techniques are suitable for use in additional or other applications, such as in the management of socially-tagged social media document collections (e.g. Twitter™ posts, Facebook™ posts, social blog posts, Wikipedia pages, and so forth).

The following notation is employed in describing the retrieval systems disclosed herein, which enable retrieval of documents associated with query key-words and/or key-persons including ranking of documents and/or persons respective to their relevance to the query. Given an e-mail collection, the different components of the search engine may be described as follows: a term-document matrix $X_w=[n_D \times n_W]$, a participant-document matrix $X_u=[n_D \times n_P]$, a term-topic distribution matrix $\Phi_t=[n_T \times n_W]$, and a participant-community distribution matrix $\Phi_c=[n_C \times n_P]$ where $n_D$, $n_W$ and $n_P$ are the number of documents, the vocabulary size and the number of persons, respectively, in the collection of documents, and $n_T$ and $n_C$ are hyper-parameters corresponding to the number of topics and the number of communities, respectively. In this illustrative example, a single "participates in" social role is considered, but it is straightforward to extend the disclosed techniques to distinguish multiple social roles. In such extensions, multiple "participant-playing-role-r-in-document" matrices $X_{u,r}$ are defined, and multiple "participant-community-in-role-r" distribution matrices $\Phi_{c,r}$ are defined, where r∈R is the social role played by the user, R being the finite set of social roles (e.g. "is_author", "is_recipient", "is_commenting", and so forth). The topic and community distributions ($\Phi_t$ and $\Phi_c$) represent the probabilities of the words given the topic and the probabilities of the persons given the community. In some embodiments these distributions are suitably obtained through matrix decomposition algorithms such as non-negative matrix factorization (NMF), or graphical topic models such as latent Dirichlet allocation (LDA) or probabilistic latent semantic analysis (PLSA). These are suitably applied "off-line", that is, before executing query-based retrieval operations, on the target multi-modal documents collection. Different models can be derived by extending these decomposition models to multi-modal (or multi-view) data, depending on the way dependencies between the topic and community latent variables are modeled. In approaches disclosed herein, the extent of these dependencies is controlled by tunable parameters that enable the dependencies to range from identity to complete independence. The dependencies are also affected by the way priors (or regularization terms) are introduced in the models to promote sparsity in the decomposition.

The query can contain both keywords (denoted herein as a vector $w_q$ of dimension $[n_W \times 1]$) and key-persons (denoted herein as a vector $u_q$ of dimension $[n_P \times 1]$). If different social roles are distinguished, there will be one facet per social role, so that the user could specify key-persons playing particular social roles.

With reference to FIG. 1, an overview of an illustrative retrieval system disclosed herein is set forth. The user interacts with a documents database 10 via a user interface, which in illustrative FIG. 1 is a database graphical user interface (GUI) 12 implemented on a computer 14. For example, the computer 14 may be a personal computer, notebook computer, tablet computer, cellular telephone (i.e. cellphone), personal data assistant (PDA), or so forth. For the illustrative email application, the database GUI 12 is suitably an email client; for other applications such as social media interaction, the database GUI may be a web page loaded into a web browser, a dedicated application program ("app") running on a tablet computer or cellphone, or so forth. The retrieval engine 16 is implemented as a set of instructions (e.g., software) executed by a computer 18, which may for example be an email server, a corporate mainframe computer, or so forth, operatively connected with the user's computer 14 via the Internet, a local area network (LAN), wide area network (WAN), wireless local area network (WLAN), various combinations thereof, or so forth. Although separate computers 14, 18 are illustrated providing user interfacing and database processing, respectively, it is also contemplated for a single computer to perform both the user interfacing and the database processing. (Said another way, it is contemplated for the computers 14, 18 to be the same computer).

It is also to be appreciated that the disclosed retrieval techniques, including document ranking and participant ranking aspects, may be implemented as a non-transitory storage medium storing the instructions performed by the computer 18 to implement the disclosed retrieval techniques. The non-transitory storage medium may, for example, include one or more (including various contemplated combinations of) a hard disk drive, or other magnetic storage medium; an optical disk or other optical storage medium, random access memory (RAM), read-only memory (ROM), flash memory, or another electronic storage medium, or so forth.

With continuing reference to FIG. 1, the user constructs and submits a query 20 via the database GUI interface 12. The query 20 may, in general, include both keyword components, i.e. query keywords 22, and a list of one or more "key-persons", i.e. query persons 24. The retrieval engine 16 receives the query 20 and computes on-line a topic distribution $\theta_{t,w_q}$ of dimension ($n_T \times 1$) and the community distribution $\theta_{c,u_q}$ of dimension ($n_C \times 1$) from the query keywords 22 and from the key-persons 24, respectively, using a "folding-in"-like algorithm (using the fixed $\Phi_t$ and $\Phi_c$ matrices). Both keyword and key-person facets are then expanded, using in the embodiment of FIG. 1 using three expansion modes: (1) mono-modal expansion 30, which combines the vectorial representations of documents of the collection 10 weighted by their mono-modal similarity with the initial query (the modes being the textual one or a social one), (2) cross-modal expansion 32, which combines the vectorial representations of documents of the collection 10 weighted by their cross-modal similarity with the initial query (i.e. the similarity in the other mode), and (3) topic or community expansion 34 in which each mode is expanded by the corresponding rows of the $\Phi_t$ and $\Phi_c$ matrices, weighted by their topic/community membership ($\theta_{t,w_q}$ and $\theta_{c,u_q}$). Assuming that $w_q$ and $u_q$ are L2-normalized vectors, as well as the rows of the $X_W$ and $X_u$ matrices, if a standard dot product (or cosine similarity) is adopted for computing monomodal similarities, these expansions may be expressed as follows:

$$\hat{w}_q = w_q + \alpha_w X_w^T X_w w_q + \beta_w X_w^T X_u u_q + \gamma_w \Phi_t^T \theta_{t,w_q} \quad (1),$$

$$\hat{u}_q = u_q + \alpha_u X_u^T X_u u_q + \beta_u X_u^T X_w w_q + \gamma_u \Phi_c^T \theta_{c,u_q} \quad (2).$$

The output of this expansion is an expanded query 40, including an expanded words component 42 denoted by the vector $\hat{w}_q$ of dimension $[n_W \times 1]$ and computed as per Equation (1), and an expanded persons component 44 denoted by the vector $\hat{u}_q$ of dimension $[n_P \times 1]$ and computed as per Equation (2). For both Equations (1) and (2), the first term ($w_q$ or $u_q$) is the initial query, the second term ($\alpha_w X_w^T X_w w_q$ or $\alpha X_u^T X_u u_q$) corresponds to its mono-modal expansion, the third term ($\beta_w X_w^T X_u u_q$ or $\beta_u X_u^T X_w w_q$) corresponds to its cross-modal expansion, and the last term ($\gamma_w \Phi_t^T \theta_{t,w_q}$ or $\gamma_u \Phi_c^T \theta_{c,u_q}$) corresponds to the topic-based (or community-based) semantic smoothing. In Equations (1) and (2), the mono-modal or cross-modal expansions could use other similarity weights than the inner product (e.g. weights $X_w w_q$ and $X_u u_q$ for the monomodal and cross-modal keywords expansion, respectively). In practice, any (optionally truncated) kernel function between the initial query and the documents of the collection could be adopted ("truncated" means that, if a document is below a similarity threshold or not belonging to the k-nearest neighbours of the query, its weights is considered as null).

With continuing reference to FIG. 1, rankings are deduced from $\hat{w}_q$ and $\hat{u}_q$. One ranking 50 is deduced for ranking emails (that is, textual documents), and another ranking 52 is deduced for ranking persons. The documents ranking 50 is obtained by sorting the similarities between the expanded textual query ($\hat{w}_q$) and the textual content of the email messages. The persons ranking 52 is directly obtained by sorting the expanded person-facet query (i.e. $\hat{u}_q$). While both rankings 50, 52 are computed and output to the user via the database GUI 12 in illustrative FIG. 2, in some instances only one of the rankings 50, 52 is computed and output, depending upon the operation being performed by the email client running on the user's computer 14. For example, if the user has requested relevant documents but not relevant persons, then only the document ranking 50 is suitably generated.

Figure 2:
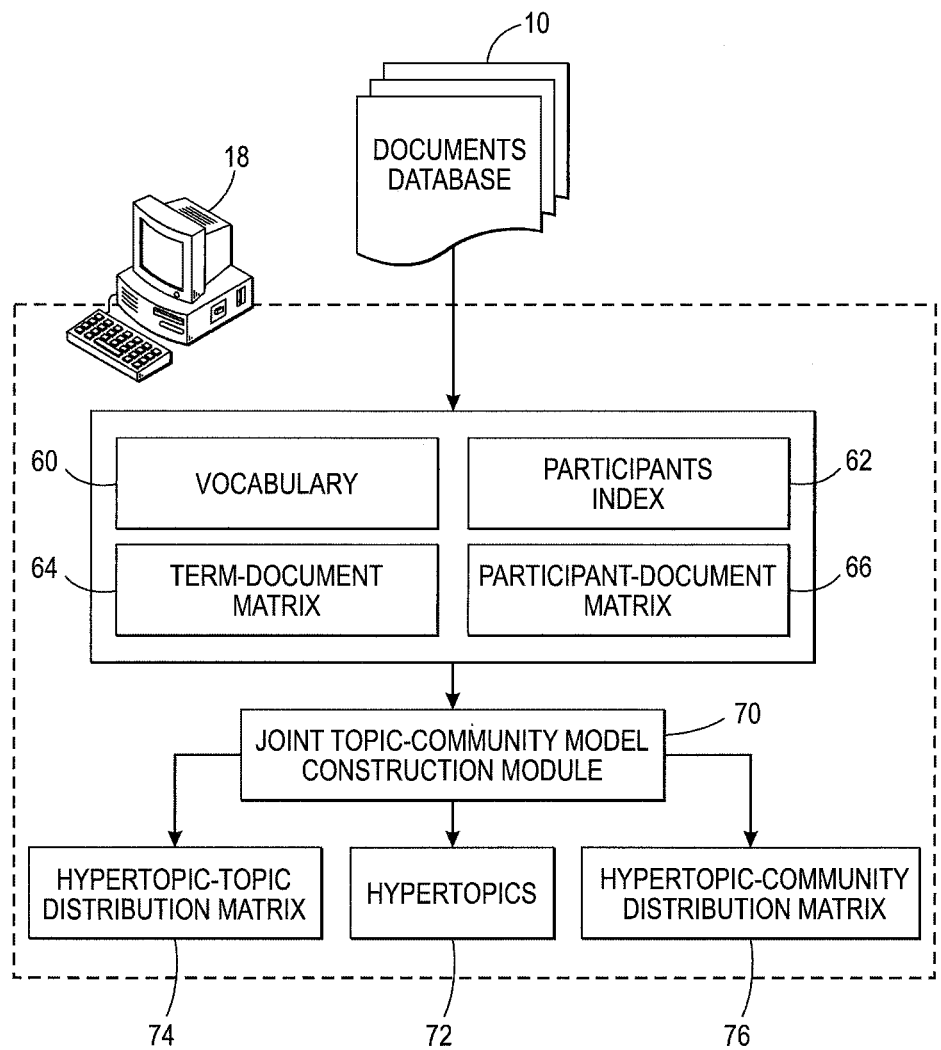
FIG. 2 diagrammatically shows an off-line pre-processing system that generates data structures used by the document retrieval system of FIG. 1.

With reference to FIG. 2, the retrieval engine 16 of FIG. 1 utilizes various parameters characterizing the documents database 10. These parameters are advantageously computed "off-line", that is, before the user engages in query-based retrieval of relevant documents and/or persons, by the computer 18 that implements the retrieval engine 16. These parameters include a vocabulary 60, which may be derived from the documents of the database 10, for example by constructing the vocabulary 60 as including each word occurring in the database 10 (optionally limited to those words occurring more than some minimum threshold number of times in the database 10, and optionally excluding uninformative frequently occurring "stopwords", such as "a", "the", "an", et cetera). Alternatively, the vocabulary 60 may be an externally provided vocabulary that is not derived from the documents database 10. As already mentioned, the number of words in the vocabulary 60 is the vocabulary size denoted herein as $n_W$. In similar fashion, a participants index 62 is suitably derived from the documents database 10 (for example, including all persons listed in the "From" or "To" fields of email messages of the database 10) or may be externally provided (for example, an employee directory in the case of a corporation).

With continuing reference to FIG. 2, the term-document matrix 64, denoted herein as $X_w = [n_D \times n_W]$, and the participant-document matrix 66, denoted herein as $X_u = [n_D \times n_P]$, are constructed. Elements of the term-document matrix $X_w$ store the number of occurrences of each word in the vocabulary 60 in each document of the database 10. Elements of the participant-document matrix $X_u$ store, for each document of the database 10, whether or not the person indexed by that element is a participant in the document. Typically, a weighting scheme such as the well-known 'tf-idf' scheme as well as L2-normalisation are applied to the entries of both matrices. Optionally, these elements may store the number of ways the person is a participant in that document, e.g. if the person may participate in more than one way for a given document.

With brief returning reference to FIG. 1, in the following the cross-modal enrichment component 32 is further considered.

The goal of the cross-modal mechanism is to take advantage of the multi-modal context. In one embodiment of the cross-modal enrichment, every participant has a specific word profile characterizing textual participation of that participant in emails. When key-persons are specified in a query, use can be made of the textual profile associated to those key-persons in order to enrich the textual portion of the query. This entails adding key-words which consists of the textual description of each key-person of the query, i.e. the words that co-occur with key-persons in the documents of the target collection 10. With $w_q$ denoting the submitted word query and $u_q$ denoting the submitted person-query (assuming a single social role r), assuming $w_q$, $u_q$ are L2-normalized, as well as the rows of $X_W$ and $X_u$, this yields the relation $\hat{w}_q = w_q + \beta_w X_w^T X_u u_q$ where $\beta_w$ is a hyper-parameter controlling the keyword enrichment rate. It will be appreciated that $\beta_w X_w^T X_u u_q$ is the cross-modal component of Equation (1).

Enrichment can also be performed in the opposite direction. Here, each word of the vocabulary is distributed among persons of the participants' index 62, some words being more specific to some persons. Hence, use can be made of the social profile (i.e. person-distribution) associated to each word in order to enrich the social portion of the query. A suitable approach is to add as key-persons the social description associated to each key-word of the query, i.e. the persons that co-occur with the key-words in the documents in the target collection. This may be formalized by the equation $\hat{u}_q = u_q + \beta_u X_u^T X_w w_q$ where $\beta_u$ is a hyper-parameter controlling the key-person enrichment rate. It will be appreciated that $\beta_u X_u^T X_w w_q$ is the cross-modal component of Equation (2).

Again, it should be noted that the cross-modal expansions can use other similarity weights than the inner product ($X_w w_q$ or $X_u u_q$). In practice, any (optionally truncated) kernel function between the initial query and the documents of the collection can be adopted. In general, the hyper-parameters can be tuned for a specific task (for instance author prediction or recipient recommendation) or can be adjusted by a user feedback mechanism.

In the following, the topic/community expansion component 34 (see FIG. 1) is considered in the context of the illustrative embodiment in which the roles are restricted to the global "participates_in" role, by aggregating over all possible social roles. In this case $X_u = \sum_{r \in R} X_{u,r}$. This is merely an illustrative example, and it is again to be understood that the disclosed retrieval approaches are readily extended to more than one social role.

In some embodiments, topics and communities distributions are obtained through matrix decomposition algorithms such as NMF (see, e.g. Lee et al., "Learning the parts of objects by non-negative matrix factorization", *Natue* vol. 401 (6755) pages 788-791 (1999)), or graphical topic models such as LDA or PLSA (see e.g. Blei et al., "Latent dirichlet allocation", *The Journal of Machine Learning Research* vol. 3 pages 993-1022 (2003); Hofmann, "Probabilistic latent semantic indexing", in Proceedings of the $22^{nd}$ annual international ACM SIGIR conference on Research and Development in Information Retrieval, pages 50-57 (ACM 1999)).

With returning reference to FIG. 2, in another embodiment, disclosed herein, the topics and communities distribution are obtained using a "joint topic-community model" learned by a joint topic-community model construction module 70 implemented by the computer 18 that models "hyper-topics" 72, which are latent classes that are abstraction of topics and communities. Each topic and community distribution is drawn from a distribution over such hyper-topics. The joint topic-community model can be suitably formalized as a generalized non-negative matrix factorization problem as follows:

$$\begin{cases} X_w \cong \Theta \Gamma_t \Phi_t, & \Theta \geq 0, \Phi_t \geq 0, \Gamma_t \geq 0 \\ X_u \cong \Theta \Gamma_c \Phi_c, & \Theta \geq 0, \Phi_c \geq 0, \Gamma_c \geq 0 \end{cases} \quad (3)$$

with additional terms (called regularization terms) in the loss function in order to promote sparsity (the loss function is a measure of the distance between the matrices on left-hand sides and the factorization at the right-hand sides). Without any regularization term on the elements of the $\Gamma$ matrices of Equation (3), the problem is ill-posed when the number of hyper-topics is higher or equal to the sum of the number of topics and the number of communities. In Equation (3), the $\Theta$ matrix represents the hyper-topic distribution per document ($n_D \times n_K$, where $n_K$ is the number of hyper-topics). The $\Gamma_t$ matrix 74 represents the topic distribution per hyper-topic ($n_K \times n_T$), and the $\Gamma_c$ matrix 76 represents the community distribution per hyper-topic ($n_K \times n_C$). The $\Phi_t$ and $\Phi_c$ matrices have already been introduced, and give the word distribution per topic and participant distribution per community, respectively.

As an alternative interpretation to this generalized matrix factorization problem, Equation (3) can be cast in a probabilistic framework (with corresponding conditional independence assumptions) as follows:

$$\begin{cases} p(w \mid d) = \sum_{z,t} p(z \mid d) p(t \mid z) p(w \mid t) \\ p(u \mid d) = \sum_{z,c} p(z \mid d) p(c \mid z) p(u \mid c) \end{cases} \quad (4)$$

In Equation (4), which generalizes the standard PLSA decomposition equation, p(w|d) is the element (d,w) of the row-normalized $X_w$ matrix (for word w in document d), z is the latent variable corresponding to the hyper-topic (z is therefore a discrete variable that can take $n_K$ values), c is the latent variable corresponding to the community, t is the latent variable corresponding to the topic, p(u|d) is the element (d,u) of the row-normalized $X_u$ matrix (for participant u in document d), p(z|d) corresponds to the element (d,z) of the $\Theta$ matrix, p(t|z) corresponds to the element (z,t) of the $\Gamma_t$ matrix, p(c|z) corresponds to the element (z,c) of the $\Gamma_c$ matrix, p(w|t) corresponds to the element (t,w) of the $\Phi_t$ matrix, and p(u|c) corresponds to the element (c,u) of the $\Phi_c$ matrix.

Note that this probabilistic framework is not completely Bayesian, as no prior is imposed on the parameters at this stage. A similar result is achieved in another way, by adding regularization terms in the loss function related to the approximation quality of the decomposition, while keeping computational tractability.

It is desired to minimize a specific loss function $L(X_w, X_u; \Theta, \Gamma_t, \Phi_t, \Gamma_c, \Phi_c)$ which measures the distance between the original matrices and the obtained decompositions. In some embodiments, the loss function is the Frobenius norm or the KL divergence. It is also desirable to enforce sparsity for the different distributions to be solved for. There is effectively a strong prior on sparsity since it is expected that a topic will be described by a small number of words among the whole vocabulary 60 and that a community will have a small amount of participants among all the candidate participants of the index 62. Sparsity is also enforced on the $\Gamma_c$ and $\Gamma_t$ matrices, i.e. a hyper-topic is typically composed of a small number of topics and a small number of communities, so that the topic-community-role correlation matrix should be sparse (i.e. one community is discussing a restricted number of topics and vice versa). One way to achieve sparsity is to add $l_1$-norm regularization terms to the loss function. For a Frobenius norm loss function, the optimization problem amounts to solving:

$$\operatorname{argmin}_{\Theta, \Phi_t, \Gamma_t, \Phi_c, \Gamma_c} \|X_w - \Theta \Gamma_t \Phi_t\|_2^2 + \|X_u - \Theta \Gamma_c \Phi_c\|_2^2 + \alpha \|\Theta\|_1 + \beta_t \|\Phi_t\|_1 + \beta_c \|\Phi_c\|_1 + \gamma_t \|\Gamma_t\|_1 + \gamma_c \|\Gamma_c\|_1 \quad (5)$$

subject to $\Theta \geq 0, \Phi_t \geq 0, \Phi_c \geq 0, \Gamma_t \geq 0, \Gamma_c \geq 0$ The degree of dependency between topics and communities is controlled by the $\gamma_c$ and $\gamma_t$ parameters. If these parameters are zero and if the number of hypertopics is superior or equal to the sum of the number of topics and the number of communities (that is, $n_K \geq n_T + n_C$), then the problem admits an infinity of solutions equivalent to (i.e. giving the same approximation error as) the de-coupled decomposition problem. With the decoupled decomposition problem, two independent sub-problems are actually being solved (topic extraction and community extraction), with no links between the sub-problems (and so, no particular link between topics and communities). At the other extreme, when raising $\gamma_t$ and $\gamma_c$ to infinity, and providing that $n_K=n_T=c_C$, this enforces the $\Gamma$ matrices to converge towards the identity matrix (up to a permutation), so that there will be a complete dependency (one-to-one mapping) between topics and communities: one topic is discussed by only one community, and vice-versa.

The problem set forth in Equation (5) is not convex for all parameters $\Theta,\Phi_t,\Gamma_t,\Phi_c,\Gamma_c$ simultaneously. However, a local minimum can be found for the objective function through a coordinate descent algorithm. In practice, a trivial generalization of the alternating non-negative least-square strategy may be adopted, or an alternating lasso may be employed (see Tibshirani, "Regression shrinkage and selection via the lasso", Journal of the Royal Statistical Society, Series B (Methodological), pages 267-288 (1996)), or efficient, scalable on-line methods such as "on-line dictionary learning" methods. See Maisal et al., "Online learning for matrix factorization and sparse coding", The Journal of Machine Learning Research vol. 11 pages 19-60 (2010).

Figure 3:
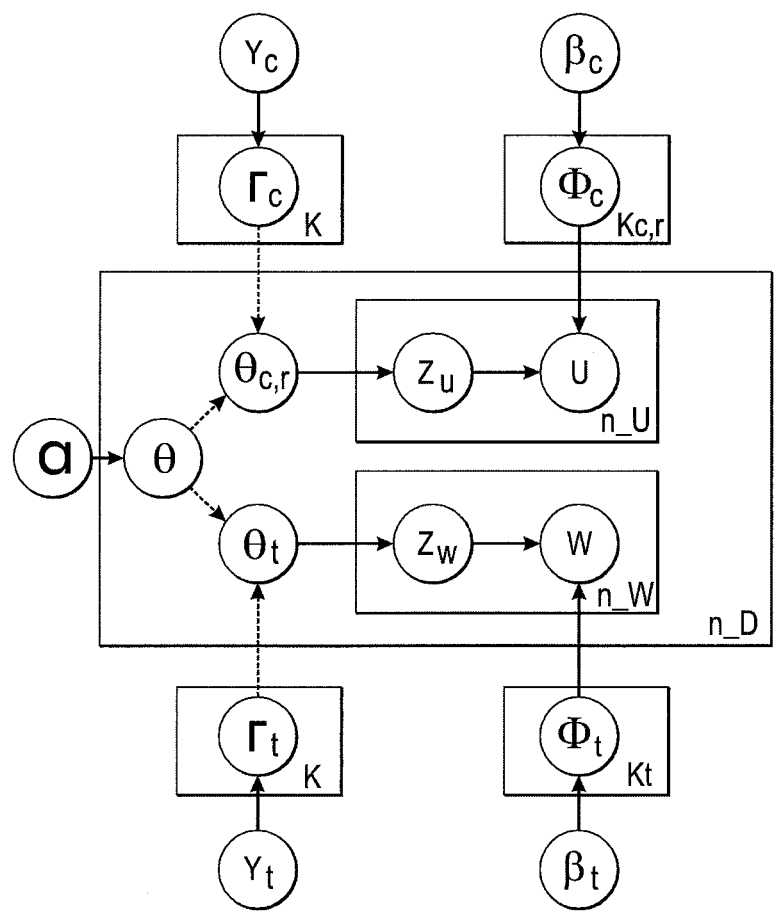
FIG. 3 diagrammatically shows the structure of the joint topic-community model output by the joint topic-community model construction module of the off-line pre-processing system of FIG. 2.

With reference to FIG. 3, the foregoing joint topic-community model is diagrammatically shown.

With reference back to FIG. 1, the constructed joint topic-community model can be used in computing the topic and community expansion component 34 of the query expansion. The latent classes enrichment aims at enriching the query in this case by using the latent classes associated to the key-words and/or the key-persons. As noted previously with reference to FIG. 2, the word-topic (and user-community) distributions are suitably computed off-line. Then, as shown in FIG. 1, when a query $(w_q, u_q)$ 20 is submitted, the retrieval engine 16 computes on-line the topic distribution $\theta_{t,w_q}$ and the community distribution $\theta_{c,u_q}$ from the keywords and from the key-persons, using a "folding-in"-like algorithm that applies the same decomposition methods as the topic/community extraction, but by fixing the $\Gamma_t, \Gamma_c, \Phi_t$ and $\Phi_c$ matrices. This amounts to solving a simpler convex optimization problem and this is analogous to the "folding-in" algorithm of PLSA. More precisely, the following decomposition problem is solved online:

$$\begin{cases} w_q = \Theta_q \Gamma_t \Phi_t, & \Theta \geq 0, \Phi_t \geq 0, \Gamma_t \geq 0 \\ u_q = \Theta_q \Gamma_c \Phi_c, & \Theta \geq 0, \Phi_c \geq 0, \Gamma_c \geq 0, \end{cases} \quad (6)$$

with $\Gamma_t, \Gamma_c, \Phi_t, \Phi_c$ already fixed to the values computed off-line by the joint topic-community model construction module 70 (FIG. 2). So, the only unknown in the online decomposition problem is the hyper-topic distribution of the query $(\Theta_q)$. Note that, if one of the query facets is absent (either $w_q$ or $u_q$), we solve only the one equation out of Equations (1) and (2) that is related to the available facet—but, it is still possible to compute both topic and community distributions, due to the coupling through the hyper-topics. In this way, another cross-modal propagation mechanism is effectively present, due to the joint topic/community extraction model.

By posing $\theta_{t,w_q}=(\Theta_q\Gamma_t)^T$ and $\theta_{c,u_q}=(\Theta_q\Gamma_c)^T$, it is possible to infer on-line a topic-distribution for this query. This "topic-query" may then be used to enrich the final query. For this purpose, we add as key-words the words that co-occur in the same topics as the query (using for this purpose the "topic-query" computed on-line). This may be formalized as follows:

$$\hat{w}_q = w_q + \gamma_w \Phi_t^T \theta_{t,w_q} \quad (7),$$

where $\gamma_w$ controls the key-words topic enrichment. Inversely, the same scheme may be applied for key-persons enrichment through communities leading to the following:

$$\hat{u}_q = u_q + \gamma_u \Phi_c^T \theta_{c,u_q} \quad (8),$$

where $\gamma_u$ controls the key-users community enrichment. As previously, all hyper-parameters can be tuned on a specific task (for instance author prediction or recipient recommendation) or can be adjusted by a user feedback mechanism.

Some illustrative advantages of the disclosed retrieval approaches are next described in the context of an illustrative email client, where the social documents are email messages of an email mailbox. Consider new user wants to discover who are the persons in charge of the reporting for a project. The user can submit as a key-word the term: "reporting" with a request to return a ranking of the most relevant participants. Due to the cross-media pseudo-relevance feedback of the disclosed retrieval process, the most relevant participants are returned. If a multi-faceted query is employed with the key-word "reporting" and the name of a known reporting person, e.g. "John Doe", the participant ranking results are refined through the expert profile of "John Doe". However, this refinement does not necessarily limit the results to only those in which "John Doe" serves as a participant, because the enrichment based on the profile of "John Doe" may cause some documents to be ranked highly even though "John Doe" is not a participant. Simply by listing "John Doe" as a persons query facet, all the complexity, and thus the richness, of the profile of "John Doe" is incorporated. This can be useful in a corporate setting in which a group of people play a specific role reflected in their email writing behavior. Instead of specifying this complexity in terms of words, it is captured in terms of key-persons.

The topic and community distribution inferred by the disclosed retrieval techniques may also be used for filtering. Indeed, a search result (i.e. list of emails or of key-persons) may be filtered through a specific topic or community. This will place at a high position in the ranking the more likely emails inside the selected communities and/or topics. For instance, for a simple word-query such as "reporting", the topic/community enrichment component may detect meaningful topics and communities. In some embodiments, the topics and communities output by the construction module 70 are manually annotated, and the search may be extended to return the names of topics or communities shared by high-ranking email messages and/or high-ranking participants. The detected topics and communities thus serve as "virtual folders" for organizing search results, except that the topics and communities are automatically detected by the disclosed retrieval process, and so the user does not need to define a manual filtering rule.

The topic enrichment can also detect email messages related to the topics addressed in emails associated with the keywords and/or commonly addressed by the key-persons. Similarly, the community enrichment can detect email messages conveyed amongst persons belonging to a community that tends to use the keywords or interact with the key-persons, even though the keywords and key-persons may not occur on some of those detected emails.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A non-transitory computer-readable storage medium storing instructions executable by a computer to perform a retrieval method on a database of documents including text and names of participants associated with the documents by operations including:
   receiving a multi-faceted retrieval query having a text query facet comprising one or more keywords and a persons query facet comprising one or more participant names;
   computing an enriched text query as an aggregation of the text query facet, a monomodal expansion of the text query facet based on the one or more keywords, a cross-modal expansion of the text query facet based on the one or more participant names, and a topic expansion of the text query facet based on a topic model associating words and topics;
   computing an enriched persons query as an aggregation of the persons query facet, a mono-modal expansion of the persons query facet based on the one or more participant names, a cross-modal expansion of the persons query facet based on the one or more keywords, and a community expansion of the persons query facet based on a community model associating persons and communities; and
   performing ranking including at least one of:
      (1) generating a ranking of documents by sorting similarities between the enriched text query and documents of the database, and
      (2) generating a ranking of persons by sorting the enriched persons query; and
   wherein at least one of:
      (I) the cross-modal expansion of the text query facet is proportional to $X_w^T X_u u_q$ where $u_q$ is a vector representing the persons query facet, $X_w$ is a term-document matrix associating words with documents of the database and $X_u$ is a participant-document matrix associating participants with documents of the database; and
      (II) the cross-modal expansion of the persons query facet is proportional to $X_u^T X_w w_q$ where $w_q$ is a vector representing the text query facet, $X_w$ is a term-document matrix associating words with documents of the database and $X_u$ is a participant-document matrix associating participants with documents of the database; and
   displaying the ranking of the documents or person query.

2. The non-transitory computer-readable storage medium of claim 1, wherein the cross-modal expansion of the text query facet comprises text of person profiles of the named participants.

3. The non-transitory computer-readable storage medium of claim 1, wherein the cross-modal expansion of the text query facet is proportional to $X_w^T X_u u_q$ where $u_q$ is a vector representing the persons query facet, $X_w$ is a term-document matrix associating words with documents of the database and $X_u$ is a participant-document matrix associating participants with documents of the database.

4. The non-transitory computer-readable storage medium of claim 1, wherein the cross-modal expansion of the persons query facet comprises persons of social profiles comprising distribution of persons associated with the keywords.

5. The non-transitory computer-readable storage medium of claim 1, wherein the cross-modal expansion of the persons query facet is proportional to $X_u^T X_w w_q$ where $w_q$ is a vector representing the text query facet, $X_w$ is a term-document matrix associating words with documents of the database and $X_u$ is a participant-document matrix associating participants with documents of the database.

6. The non-transitory computer-readable storage medium of claim 1, wherein the performing of query enrichment further includes:
   constructing a joint topic-community model defining hypertopics and associating topics with the hypertopics and communities with the hypertopics;
   wherein the topic expansion uses the joint topic-community model as the topic model associating words and topics and the community expansion uses the joint topic-community model as the community model associating persons and communities.

7. The non-transitory computer-readable storage medium of claim 6, wherein the constructing of the joint topic-community model is performed offline before the performing of the query enrichment and the performing of the ranking.

8. The non-transitory computer-readable storage medium of claim 1, wherein the database of documents comprises an electronic mail (email) mailbox, the receiving comprises receiving the multi-faceted retrieval query from a computer running an email client, and the retrieval method further includes transmitting at least one of a ranking of documents and a ranking of persons to the computer running the email client.

9. An apparatus comprising:
   a computer; and
   a non-transitory computer-readable storage medium as set forth in claim 1 storing instructions executable by the computer to perform a retrieval method on a database of documents including text and names of participants associated with the documents.

10. A computer-implemented retrieval method operating on a database of documents including text and names of participants associated with the documents, the retrieval method comprising:
    receiving a retrieval query having at least one of a text query facet comprising one or more keywords and a persons query facet comprising one or more participant names;
    performing query enrichment including at least one of:
       (1) computing an enriched text query as an aggregation of the text query facet, a monomodal expansion of the text query facet based on the one or more keywords, a cross-modal expansion of the text query facet based on the one or more participant names, and a topic expansion of the text query facet based on a topic model associating words and topics, and
       (2) computing an enriched persons query as an aggregation of the persons query facet, a monomodal expansion of the persons query facet based on the one or more participant names, a cross-modal expansion of the persons query facet based on the one or more keywords, and a community expansion of the persons query facet based on a community model associating persons and communities; and
    performing ranking including at least one of:
       (1) generating a ranking of documents by sorting similarities between the enriched text query and documents of the database, and
       (2) generating a ranking of persons by sorting the enriched persons query;

wherein the retrieval method is performed by a computer; and wherein the cross-modal expansion of the persons query facet is proportional to $X_u^T X_w w_q$ where $w_q$ is a vector representing the text query facet, $X_w$ is a term-document matrix associating words with documents of the database and $X_u$ is a participant-document matrix associating participants with documents of the database; and displaying the ranking of the documents or person query.

11. The retrieval method of claim 10 wherein:

the retrieval query includes both a text query facet and a persons query facet, and the performing of query enrichment includes both computing an enriched text query and computing an enriched persons query.

12. The retrieval method of claim 10, wherein the cross-modal expansion of the text query facet comprises text of person profiles of the named participants.

13. The retrieval method of claim 10, wherein the cross-modal expansion of the persons query facet comprises persons of social profiles comprising distribution of persons associated with the keywords.

14. The retrieval method of claim 10, wherein the performing of query enrichment further includes:

constructing a joint topic-community model defining both the topic model and the community model in terms of hypertopics with both the topics of the topic model and the communities of the community model associated with hypertopics.

15. The retrieval method of claim 14, wherein the database of documents comprises an electronic mail (email) mailbox, the receiving comprises receiving the multi-faceted retrieval query from a computer running an email client, and the retrieval method further includes transmitting an output of the performed ranking to the computer running the email client.

16. A computer-implemented retrieval method operating on a database of documents including text and names of participants associated with the documents, the retrieval method comprising:

receiving a retrieval query having at least one of a text query facet comprising one or more keywords and a persons query facet comprising one or more participant names;

performing query enrichment including at least one of:

(1) computing an enriched text query as an aggregation of the text query facet, a monomodal expansion of the text query facet based on the one or more keywords, a cross-modal expansion of the text query facet based on the one or more participant names, and a topic expansion of the text query facet based on a topic model associating words and topics, and (2) computing an enriched persons query as an aggregation of the persons query facet, a monomodal expansion of the persons query facet based on the one or more participant names, a cross-modal expansion of the persons query facet based on the one or more keywords, and a community expansion of the persons query facet based on a community model associating persons and communities; and performing ranking including at least one of:

(1) generating a ranking of documents by sorting similarities between the enriched text query and documents of the database, and (2) generating a ranking of persons by sorting the enriched persons query;

wherein the retrieval method is performed by a computer; and wherein the cross-modal expansion of the text query facet is proportional to $X_w^T X_u u_q$ where $u_q$ is a vector representing the persons query facet, $X_w$ is a term-document matrix associating words with documents of the database and $X_u$ is a participant-document matrix associating participants with documents of the database; and displaying the ranking of the documents or person query.

17. The retrieval method of claim 16, wherein the cross-modal expansion of the persons query facet is proportional to $X_u^T X_w w_q$ where $w_q$ is a vector representing the text query facet, $X_w$ is a term-document matrix associating words with documents of the database and $X_u$ is a participant-document matrix associating participants with documents of the database.

18. The retrieval method of claim 16 wherein:

the retrieval query includes both a text query facet and a persons query facet, and the performing of query enrichment includes both computing an enriched text query and computing an enriched persons query.

19. The retrieval method of claim 16, wherein the cross-modal expansion of the text query facet comprises text of person profiles of the named participants.

20. The retrieval method of claim 16, wherein the cross-modal expansion of the persons query facet comprises persons of social profiles comprising distribution of persons associated with the keywords.

21. The retrieval method of claim 16, wherein the performing of query enrichment further includes:

constructing a joint topic-community model defining both the topic model and the community model in terms of hypertopics with both the topics of the topic model and the communities of the community model associated with hypertopics.

* * * * *